(12) United States Patent
Oyama et al.

(10) Patent No.: US 11,162,429 B2
(45) Date of Patent: Nov. 2, 2021

(54) TURBO FAN ENGINE

(71) Applicant: IHI CORPORATION, Koto-ku (JP)

(72) Inventors: Akihiko Oyama, Koto-ku (JP); Noriko Morioka, Koto-ku (JP); Naoki Seki, Koto-ku (JP)

(73) Assignee: IHI CORPORATION, Koto-ku (JP)

( * ) Notice: Subject to any disclaimer, the term of this patent is extended or adjusted under 35 U.S.C. 154(b) by 51 days.

(21) Appl. No.: 16/850,062

(22) Filed: Apr. 16, 2020

(65) Prior Publication Data

US 2020/0263614 A1    Aug. 20, 2020

Related U.S. Application Data

(63) Continuation of application No. PCT/JP2018/021578, filed on Jun. 5, 2018.

(30) Foreign Application Priority Data

Nov. 13, 2017 (JP) .............................. JP2017-218532

(51) Int. Cl.
*F02C 7/36* (2006.01)
*F02C 7/275* (2006.01)
*F02C 7/32* (2006.01)

(52) U.S. Cl.
CPC ................. *F02C 7/36* (2013.01); *F02C 7/275* (2013.01); *F02C 7/32* (2013.01);
(Continued)

(58) Field of Classification Search
CPC ............... F02C 7/275; F02C 7/32; F02C 7/36
(Continued)

(56) References Cited

U.S. PATENT DOCUMENTS 3,100,378 A    8/1963 Austin et al.
5,349,814 A *  9/1994 Ciokajlo ................. F02C 7/262
                                                    60/226.1
(Continued)

FOREIGN PATENT DOCUMENTS

JP    2007-040302 A    2/2007
JP    2010-077819 A    4/2010
(Continued)

OTHER PUBLICATIONS

International Search Report dated Aug. 7, 2018 in PCT/JP2018/021578 filed on Jun. 5, 2018, citing documents AA-AB & AO-AQ therein, 2 pages.

*Primary Examiner* — Justin D Seabe
(74) *Attorney, Agent, or Firm* — Oblon, McClelland, Maier & Neustadt, L.L.P.

(57) ABSTRACT

Provided is a turbo fan engine (TF) provided with a power transmission device that switches main shafts (MSs) connected to a starter generator (SG) so as to perform power transmission, between at startup and after the startup. The TF includes a first MS and a second MS. The power transmission device includes a first shaft, an intermediate shaft, and a second shaft that are coaxially disposed, and a clutch. The first shaft is connected to the first MS through bevel gears, the intermediate shaft is disposed outside of the first shaft and is connected to the SG through bevel gears, and the second shaft is disposed outside of the intermediate shaft and is connected to the second MS through bevel gears. When, out of any two adjacent shafts of the first shaft, the intermediate shaft, and the second shaft, an inner shaft tries to rotate at a speed higher than a speed of an outer shaft, the clutch causes the both shafts to engage with each other and to rotate at the same speed, and transmits power, whereas when the outer shaft tries to rotate at a speed higher than a
(Continued)

speed of the inner shaft, the clutch causes the both shafts to disengage from each other, and does not transmit power.

12 Claims, 7 Drawing Sheets

(52) U.S. Cl.
CPC .... *F05D 2220/323* (2013.01); *F05D 2240/60* (2013.01); *F05D 2260/4031* (2013.01)

(58) Field of Classification Search
USPC .................................................. 60/226.1, 788
See application file for complete search history.

(56) References Cited

U.S. PATENT DOCUMENTS

| | | | | |
|---|---|---|---|---|
| 7,997,085 B2* | 8/2011 | Moniz | ...................... | F02C 7/277 |
| | | | | 60/788 |
| 8,074,455 B2* | 12/2011 | Pierrot | ...................... | F02C 7/36 |
| | | | | 60/792 |
| 8,500,583 B2* | 8/2013 | Goi | ........................ | F02C 7/275 |
| | | | | 475/5 |
| 2007/0022735 A1* | 2/2007 | Henry | ....................... | F02C 7/36 |
| | | | | 60/39.162 |
| 2011/0101693 A1 | 5/2011 | Goi et al. | | |

FOREIGN PATENT DOCUMENTS

| | | |
|---|---|---|
| JP | 2011-117437 A | 6/2011 |
| WO | WO 2009/067048 A1 | 5/2009 |

\* cited by examiner

TURBO FAN ENGINE

TECHNICAL FIELD

Embodiments described herein relate to a turbo fan engine. More specifically, the embodiments described herein relate to a turbo fan engine provided with a power transmission device that has a function to switch a main shaft supplied with power from a starter generator at startup and a main shaft supplying power to the starter generator after the startup.

BACKGROUND ART

A turbo fan engine includes a fan that is disposed on a frontmost part and a core engine that is disposed coaxially with the fan on a rear side of the fan.

In a case of a two-spool turbo fan engine, the core engine includes a low-pressure compressor, a high-pressure compressor, a combustor, a high-pressure turbine, and a low-pressure turbine in order from a front side (upstream side) toward a rear side (downstream side). A rotor of the high-pressure turbine rotatably drives a rotor of the high-pressure compressor through a high-pressure shaft. A rotor of the low-pressure turbine rotatably drives a rotor of the low-pressure compressor and a rotor of the fan through a low-pressure shaft. Note that each of the high-pressure shaft and the low-pressure shaft (main shafts) is a hollow shaft, and the low-pressure shaft is disposed inside the high-pressure shaft.

During operation of the turbo fan engine, a part of air that has been sucked by the fan and compressed flows into the core engine, and contributes to generation of high-temperature high-pressure gas to drive the low-pressure turbine that is a rotational driving source for the fan and the low-pressure compressor. A remaining part of the air bypasses the core engine and is discharged from the rear side, thereby contributing to generation of most of thrust.

The turbo fan engine mounted on an aircraft includes a generator that is driven by power supplied from the main shafts in order to supply power to an engine control apparatus and electric/electronic apparatuses mounted on an airframe.

To start up the turbo fan engine, it is necessary to forcibly rotate the main shafts by supplying power (this is called rotation assistance) up to a rotational speed at which a fuel is ignited and thereby self-sustaining operation is possible. Accordingly, the turbo fan engine includes a device to supply power to the main shafts at startup, that is, a starter.

In a conventional turbo fan engine, as the starter, a starter of an air turbine type that is driven by compressed air supplied from outside (other started engine, APU (auxiliary power unit) mounted on an airframe, an air source placed on ground, etc.) has been frequently used.

In a recent turbo fan engine, however, an electric motor is used as the starter. In this case, the starter is formed to operate also as the generator having the above-described function, and is called a starter generator.

In the turbo fan engine including such a starter generator, transmission of the power between the starter generator and the main shaft (normally, a high-pressure shaft, and following description is also based on this premise) of the engine is performed through a PTO (power take-off) shaft.

The PTO shaft is normally disposed on a front side of the turbo fan engine, and is disposed inside a front frame that supports the front side of the high-pressure shaft and the front side of the low-pressure shaft through bearings. The front frame includes annular parts that bound an inside and an outside of an annular flow path (core flow path) of the core engine. These parts are connected to each other by a plurality of hollow struts each having a streamlined cross-section. The above-described PTO shaft extends inside one of the struts extending in a radial direction (or a direction slightly inclined from the radial direction).

At one end of the PTO shaft (an end part located at radially inner side of the turbo fan engine), a bevel gear that engages with a bevel gear attached near a front end part of the high-pressure shaft is attached. The power is transmitted between the PTO shaft and the high-pressure shaft through a combination of the both bevel gears.

A bevel gear is also attached at the other end (an end part located radially outer side of the turbo fan engine) of the PTO shaft. The power is transmitted between the bevel gear and a bevel gear that is attached at a front end of an input shaft of an AGB (accessory gear box) disposed inside a core cowl (outside a high-pressure compressor case) surrounding the core engine.

Note that, in a case where the AGB is disposed outside a fan case surrounding the fan, the PTO shaft further extends from the inside of the above-described strut of the front frame to the outside of the fan case through an inside of a strut connecting annular parts that bound an inside and an outside of an air flow path (bypass flow path) bypassing the core engine.

The AGB is a device that drives accessories (in addition to the above-described starter generator, a fuel pump supplying fuel to a combustor, a lubricant pump supplying lubricant to bearings supporting the high-pressure shaft and the low-pressure shaft, etc.) needed for operation of the turbo fan engine. The power transmitted from the high-pressure shaft of the engine to the input shaft through the PTO shaft is distributed to driving shafts of the respective accessories through a gear train disposed inside the AGB. The starter generator is normally coupled to a shaft disposed coaxially with the input shaft.

To start up the turbo fan engine having the above-described configuration, the starter generator is operated as the electric motor. The generated rotational power is transmitted to the high-pressure shaft through the PTO shaft, and the high-pressure shaft then starts to rotate. At a time when the rotational speed of the high-pressure shaft reaches a predetermined rotational speed, injection of the fuel (and operation of an igniter) inside the combustor is started. Presently, the fuel is ignited, and power generated when generated combustion gas passes through the high-pressure turbine also starts to contribute to increase of the rotational speed of the high-pressure shaft. Thereafter, when the engine reaches a self-sustaining operation state, operation of the starter generator as the electric motor ends, and the rotation assistance also ends.

Thereafter, rating of the engine reaches an idle rating; however, the starter generator has started operation as the generator at the same time when the above-described rotation assistance ends. Accordingly, thereafter (including operation with higher rating), the starter generator generates electricity by the power supplied from the high-pressure shaft through the PTO shaft.

As described above, the method in which the power to operate the starter generator as the generator after the startup is extracted from the high-pressure shaft has the following issues.

At the low rating such as the idle rating, the high-pressure compressor is in a state where surging that is unstable phenomenon with backflow of the air easily occurs. At this time, for example, if power demand of the electric/electronic apparatuses mounted on the airframe is increased and the large power is extracted from the high-pressure shaft through the starter generator, the high-pressure compressor may cause surging.

As measures to avoid the surging, the high-pressure compressor may be designed so as to hardly cause the surging at the low rating (i.e., so as to increase margin with respect to occurrence of surging (surge margin)). In the high-pressure compressor designed in such a manner, however, efficiency is sacrificed in exchange for securement of the surge margin, which deteriorates fuel efficiency of the turbo fan engine.

Accordingly, in place thereof, the rating at which sufficiently large surge margin is secured may be set as the idle rating. In this case, the idle rating is set to higher rating at which the fuel consumption is large, which deteriorates the fuel efficiency of the turbo fan engine over the whole of the flight mission (startup, taxing, takeoff, climb, cruise, descent, landing, taxing, and stop). Further, at the higher rating, generated thrust is also high. To maintain the stop state of the parked aircraft against the thrust, a brake is requested to be increased in size, which increases the airframe weight.

In contrast, an upper limit may be set to the power to be extracted at the low rating such as the idle rating. In this case, a large APU to be mounted on the airframe is to be adopted in order to satisfy power demand of the electric/electronic apparatuses also mounted on the airframe. This also increases the airframe weight.

To solve the above-described issues, a method in which power is extracted not from the high-pressure shaft but from the low-pressure shaft in order to operate the starter generator as the generator after the startup has been proposed (Patent Document 1).

A turbo fan engine disclosed in Patent Document 1 (see FIG. 2) includes a PTO shaft (36) that is connected to a low-pressure shaft (28) though bevel gears (44 and 46) and is also connected to a starter generator, and a bevel gear (48) that engages with a gear (52) rotating together with a high-pressure shaft (26). A one-way clutch (50) is disposed between the PTO shaft (36) and the bevel gear (48). When the starter generator rotates the PTO shaft (36) at startup, the one-way clutch (50) causes the PTO shaft (36) and the bevel gear (48) to engage with each other, rotation of the PTO shaft (36) is transmitted to the high-pressure shaft (26) through the bevel gear (48) and the gear (52), and the rotational speed of the high-pressure shaft (26) increases. After the startup, engagement of the PTO shaft (36) and the bevel gear (48) by the one-way clutch (50) is released, the power is supplied from the low-pressure shaft (28) to the starter generator through the bevel gears (44 and 46) and the PTO shaft (36), and electricity is generated.

RELATED ART DOCUMENT

Patent Document

Patent Document 1: Japanese Patent Laid-Open No. 2007-40302

SUMMARY OF THE DISCLOSURE

Problems to be Solved by the Disclosure

In the turbo fan engine disclosed in Patent Document 1, the PTO shaft connected to the starter generator is constantly connected to the low-pressure shaft. Therefore, when the high-pressure shaft is accelerated up to the rotational speed at which the self-sustaining operation is possible at startup, the low-pressure shaft is also accelerated up to a considerable rotational speed at the same time. As a result, thrust excess for the parked aircraft is generated. To maintain the stop state of the aircraft, a brake having a large size is requested, which increases the airframe weight. Further, to increase the rotational speed of each of the high-pressure shaft and the low-pressure shaft to the above-described state, a large starter generator having extremely large electric motor output is to be adopted, which also causes weight increase.

The present disclosure is made in consideration of the above-described issues, and an object of the present disclosure is to provide a turbo fan engine provided with a power transmission device that has a function to switch a main shaft supplied with power from a starter generator at startup and a main shaft supplying power to the starter generator after the startup.

Means for Solving the Problems

To solve the above-described issues, a turbo fan engine according to an embodiment of the present disclosure includes a first main shaft, a second main shaft, a power transmission device, and a starter generator. The power transmission device includes a first shaft, an intermediate shaft, and a second shaft that are coaxially disposed, and a clutch. The first shaft is connected to the first main shaft through a pair of bevel gears. The intermediate shaft is disposed outside of the first shaft and is connected to the starter generator through a pair of bevel gears. The second shaft is disposed outside of the intermediate shaft and is connected to the second main shaft through a pair of bevel gears. When, out of any two adjacent shafts of the first shaft, the intermediate shaft, and the second shaft, an inner shaft tries to rotate at a speed higher than a speed of an outer shaft, the clutch causes the two shafts to engage with each other and to rotate at the same speed, and transmits power, whereas when the outer shaft tries to rotate at a speed higher than a speed of the inner shaft, the clutch causes the two shafts to disengage from each other, and does not transmit power.

Effects of the Disclosure

According to the turbo fan engine of the present disclosure, the power to operate the starter generator as the generator is constantly extracted from the low-pressure shaft and is not extracted from the high-pressure shaft. Accordingly, the high-pressure compressor does not cause surging at the low rating. Further, deterioration of fuel efficiency and increase of the airframe weight are not caused by change of the design for securement of the surge margin of the high-pressure compressor and setting of the higher idle rating. Moreover, since only the high-pressure shaft is driven by the starter generator that operates as the electric motor at startup, adoption of a large starter generator having extremely large electric motor output is not requested, and increase of the airframe weight is avoidable, unlike the turbo fan engine disclosed in Patent Document 1.

MODE FOR CARRYING OUT THE DISCLOSURE

An embodiment of the present disclosure is described in detail below with reference to drawings.

Figure 1:
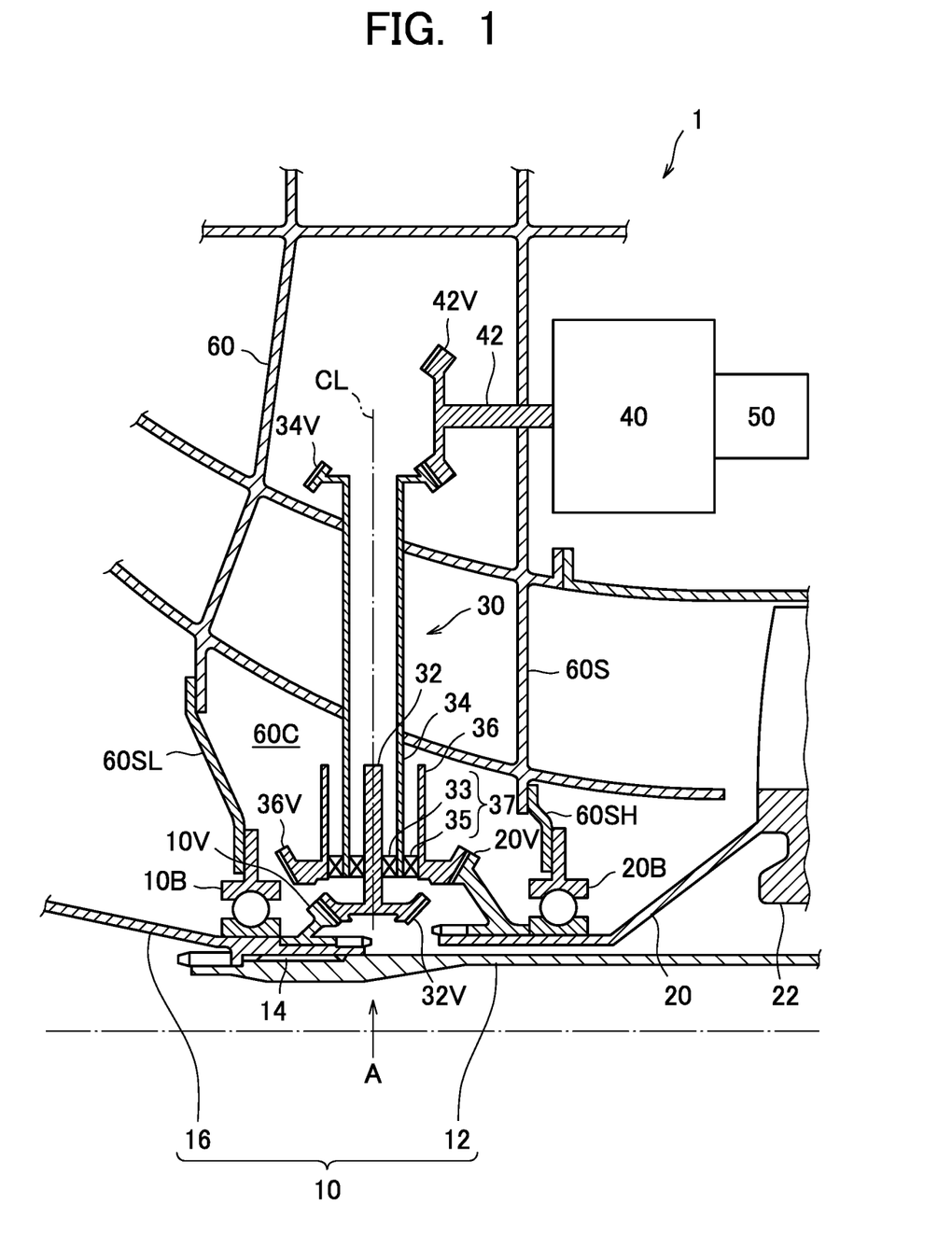
FIG. 1 is an enlarged cross-sectional view illustrating a main part of a turbo fan engine that is provided with a power transmission device according to an embodiment of the present disclosure and includes two main shafts rotating in directions opposite to each other.

FIG. 1 is an enlarged cross-sectional view illustrating a main part of a two-spool turbo fan engine including a power transmission device according to the embodiment of the present disclosure.

A turbo fan engine 1 according to the embodiment of the present disclosure includes a low-pressure shaft (a first main shaft) 10, a high-pressure shaft (a second main shaft) 20, a power transmission device 30, an AGB 40, and a starter generator 50.

The low-pressure shaft 10 includes a fan drive shaft 12 that is connected to a rotor (not illustrated) of a low-pressure turbine on a rear side (right side in the figure), and a fan shaft 16 that is connected to a rotor (not illustrated) of a fan at a front end part. The fan drive shaft 12 and the fan shaft 16 are connected to each other by a spline coupling 14 that can transmit torque while allowing relative movement in an axial direction.

The high-pressure shaft 20 is connected to a rotor 22 of a high-pressure compressor on the rear side (right side in the figure).

Note that, in FIG. 1, a reference numeral 10B denotes a bearing that supports a vicinity of a rear end part of the fan shaft 16, and is supported by a bearing support 60SL fixed to a front frame 60. Further, a bevel gear 10V is attached to an outer periphery in the vicinity of the rear end part (rear side of the bearing 10B) of the fan shaft 16.

In FIG. 1, a reference numeral 20B denotes a bearing that supports a vicinity of a front end part of the high-pressure shaft 20, and is supported by a bearing support 60SH fixed to the front frame 60. Further, a bevel gear 20V is attached to an outer periphery in the vicinity of a front end part (front side of the bearing 20B) of the high-pressure shaft 20.

The low-pressure shaft 10 and the high-pressure shaft 20 are formed so as to rotate in directions opposite to each other during operation of the turbo fan engine 1. Note that, in the following description, it is assumed that the high-pressure shaft 20 rotates in a counterclockwise direction and the low-pressure shaft 10 rotates in a clockwise direction as viewed from the rear side of the turbo fan engine 1.

The power transmission device 30 includes three shafts that are disposed coaxially about a center axis CL extending in a radial direction (or a direction slightly inclined from the radial direction) of the turbo fan engine 1. The three shafts are a low-pressure power transmission shaft 32 (a first shaft), a starter generator power transmission shaft (an SG power transmission shaft) 34 (intermediate shaft), and a high-pressure power transmission shaft 36 (a second shaft) in order from the inside.

The SG power transmission shaft 34 has a function to transmit power between the starter generator 50 and one of the low-pressure power transmission shaft 32 and the high-pressure power transmission shaft 36 through a low-pressure clutch 33 and a high-pressure clutch 35 described below. The SG power transmission shaft 34 extends from the vicinity of the low-pressure shaft 10 and the high-pressure shaft 20 (inside a bearing chamber 60C where the above-described bearings 10B and 20B are disposed in the front frame 60) radially outward through an inside of a strut 60S of the front frame 60.

A bevel gear 34V is attached at an outer end part (an end part located radially outer side of the turbo fan engine 1) of the SG power transmission shaft 34, and engages with a bevel gear 42V attached at a front end of an input shaft 42 of the AGB 40. Accordingly, the SG power transmission shaft 34 can transmit the power to the input shaft 42 of the AGB 40 through the bevel gears 34V and 42B (a pair of bevel gears), and the input shaft 42 is connected to the starter generator 50 through a power transmission mechanism inside the AGB 40.

Note that, although illustration is omitted, the SG power transmission shaft 34 is supported by a support member fixed to the front frame 60, through bearings (at least one ball bearing and at least one roller bearing) at an optimal position in the axial direction.

The low-pressure power transmission shaft 32 has a function to transmit the power from the low-pressure shaft 10 to the SG power transmission shaft 34 in cooperation with the low-pressure clutch 33 described below. Further, the high-pressure power transmission shaft 36 has a function to transmit the power from the SG power transmission shaft 34 to the high-pressure shaft 20 in cooperation with the high-pressure clutch 35 described below.

Accordingly, unlike the SG power transmission shaft 34, these shafts do not extend long radially outward but extend short so as to be housed inside the bearing chamber 60C.

Although illustration is omitted, bearings (at least one ball bearing and at least one roller bearing) are disposed between the low-pressure power transmission shaft 32 and the SG power transmission shaft 34 and between the SG power transmission shaft 34 and the high-pressure power transmission shaft 36 such that the two shafts adjacent to each other on the inner side and the outer side are rotatable at the rotational speeds different from each other.

Note that, among the bearings supporting the SG power transmission shaft 34, the bearing disposed on the radially inner side may be used as a bearing supporting the high-pressure power transmission shaft 36 located on the outermost side.

A bevel gear 32V is attached to an inner end part (the end part located on radially inner side of the turbo fan engine 1) of the low-pressure power transmission shaft 32, and engages with the above-described bevel gear 10V. Accordingly, the low-pressure power transmission shaft 32 can transmit the power with the low-pressure shaft 10 through the bevel gears 32V and 10V (a pair of bevel gears), and rotates in the counterclockwise direction as viewed from the radially inner side of the turbo fan engine 1 (i.e., as viewed from a direction indicated by the arrow A in FIG. 1) along with the rotation of the low-pressure shaft 10.

Likewise, a bevel gear 36V is attached to an inner end part of the high-pressure power transmission shaft 36, and engages with the above-described bevel gear 20V. Accordingly, the high-pressure power transmission shaft 36 can transmit the power with the high-pressure shaft 20 through the bevel gears 36V and 20V (a pair of bevel gears), and rotates in the counterclockwise direction as viewed from the radially inner side of the turbo fan engine 1 (i.e., as viewed from the direction indicated by the arrow A in FIG. 1) along with the rotation of the high-pressure shaft 20.

A speed ratio (gear ratio) of the bevel gear 32V and the bevel gear 10V and a speed ratio (gear ratio) of the bevel gear 36V and the bevel gear 20V are set such that the rotational speed of the high-pressure power transmission shaft 36 becomes higher than the rotational speed of the low-pressure power transmission shaft 32 at all of ratings of the turbo fan engine 1 experienced during flight mission. The rotational speed of the high-pressure shaft during the self-sustaining operation is constantly higher than the rotational speed of the low-pressure shaft because of characteristics of the turbo fan engine. Therefore, when the speed ratios of the above-described two pairs of bevel gears are set to the same speed ratio, the above-described condition is automatically satisfied. However, the speed ratios of the above-described two pairs of bevel gears can be appropriately set within a range satisfying the above-described condition.

As described above, the SG power transmission shaft 34 can transmit the power with the low-pressure power transmission shaft 32 and the high-pressure power transmission shaft 36. Accordingly, the SG power transmission shaft 34 rotates in the counterclockwise direction as viewed from the radially inner side of the turbo fan engine 1 (i.e., as viewed from the direction indicated by the arrow A in FIG. 1) as with these shafts.

The power transmission device 30 further includes a clutch 37. The clutch 37 includes the low-pressure clutch 33 (a first clutch) disposed between the low-pressure power transmission shaft 32 and the SG power transmission shaft 34, and the high-pressure clutch 35 (a second clutch) disposed between the SG power transmission shaft 34 and the high-pressure power transmission shaft 36.

The low-pressure clutch 33 is formed by a structure provided on at least one of an outer surface of the low-pressure power transmission shaft 32 and an inner surface of the SG power transmission shaft 34, near an inner end part (the end part located on radially inner side of the turbo fan engine 1) of the power transmission device 30 in the direction of the center axis CL.

Likewise, the high-pressure clutch 35 is also formed by a structure provided on at least one of an outer surface of the SG power transmission shaft 34 and an inner surface of the high-pressure power transmission shaft 36, near the inner end part (preferably, at the position same as the low-pressure clutch 33) of the power transmission device 30 in the direction of the center axis CL.

Each of the low-pressure clutch 33 and the high-pressure clutch 35 is formed as a one-way clutch.

Figure 2:
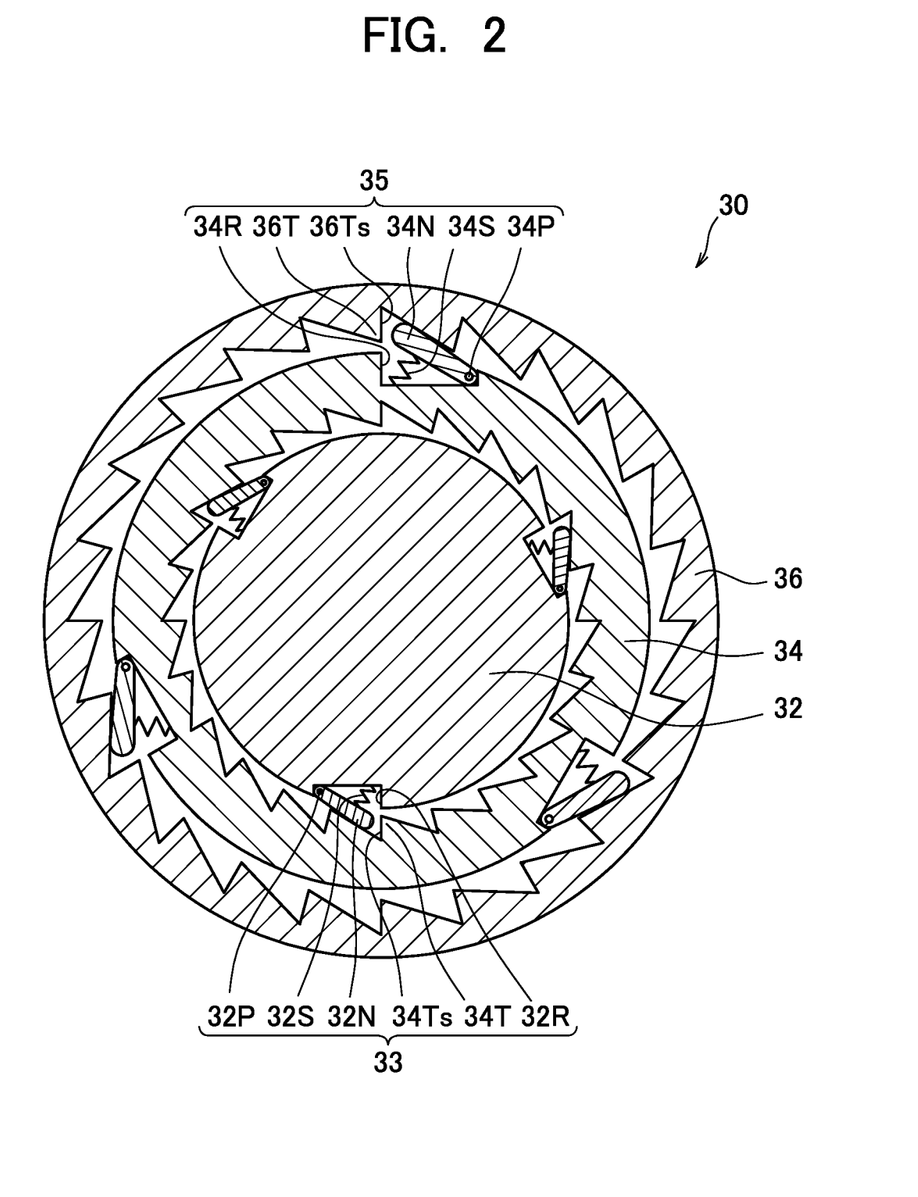
FIG. 2 is a diagram viewed from a direction of an arrow A in FIG. 1 and illustrates a cross-section perpendicular to an axial direction, of the power transmission device according to an embodiment.

In FIG. 2 that is a diagram viewed from the direction of the arrow A in FIG. 1, when an inner shaft out of two adjacent shafts tries to rotate in the counterclockwise direction with respect to an outer shaft, the one-way clutch causes the both shafts to engage with each other and to rotate at the same speed, and transmits the power. In contrast, when the inner shaft tries to rotate in the clockwise direction with respect to the outer shaft (or the outer shaft tries to rotate in the counterclockwise direction with respect to the inner shaft), the clutch causes the both shafts to disengage from each other, and does not transmit the power.

In other words, when an inner shaft out of the two shafts rotating in the same direction tries to rotate at a speed higher than a speed of an outer shaft, the clutch causes the both shafts to engage with each other and to rotate at the same speed, and transmits the power. This occurs specifically in the following cases. Note that the corresponding shaft when each event occurs during operation of the turbo fan engine 1 is described in parenthesis.

(1) Case where both shafts (the SG power transmission shaft 34 and the high-pressure power transmission shaft 36) are stopped, and only the inner shaft (the SG power transmission shaft 34) starts to rotate (2) Case where rotational speed of the inner shaft (the low-pressure power transmission shaft 32) that has rotated at rotational speed lower than rotational speed of the outer shaft (the SG power transmission shaft 34) increases and exceeds the rotational speed of the outer shaft (the SG power transmission shaft 34)

(3) Case where rotational speed of the outer shaft (the high-pressure power transmission shaft 36) that has rotated at rotational speed higher than rotational speed of the inner shaft (the SG power transmission shaft 34) is reduced and becomes lower than the rotational speed of the inner shaft (the SG power transmission shaft 34)

In contrast, when the outer shaft tries to rotate at the speed higher than the speed of the inner shaft, the clutch causes the both shafts to disengage from each other, and does not transmit the power. This occurs specifically in the following cases (description in parenthesis is similar to above).

(1) Case where both shafts (the low-pressure power transmission shaft 32 and the SG power transmission shaft 34) are stopped, and only the outer shaft (the SG power transmission shaft 34) starts to rotate (2) Case where rotational speed of the outer shaft (the high-pressure power transmission shaft 36) that has rotated at rotational speed equal to rotational speed of the inner shaft (the SG power transmission shaft 34) increases and exceeds rotational speed of the inner shaft (the SG power transmission shaft 34)

(3) Case where rotational speed of the inner shaft (the low-pressure power transmission shaft 32) that has rotated at rotational speed equal to rotational speed of the outer shaft (the SG power transmission shaft 34) is reduced and becomes lower than rotational speed of the outer shaft (the SG power transmission shaft 34)

When the operation is performed in the above-described manner, the low-pressure clutch 33 and the high-pressure clutch 35 cooperate with each other to exert a function of switching a shaft that performs power transmission with the SG power transmission shaft 34, to the low-pressure power transmission shaft 32 or the high-pressure power transmission shaft 36.

As the one-way clutch, various types of clutches such as a ratchet type, a roller type, and a sprag type are well-known, and an optional clutch among them is adoptable.

In the embodiment illustrated in FIG. 2, the low-pressure clutch 33 is a ratchet type one-way clutch. On the outer surface of the low-pressure power transmission shaft 32 (the inner shaft), a plurality of recesses 32R are provided at equal intervals in a circumferential direction. In each of the recessed 32R, a clutch claw 32N that has a shape housable therein is supported in a state of being rockable in the radial direction with a pivot shaft 32P as a center and being pressed against the radially outer side by an elastic member 32S such as a spring. Further, sawtooth-shaped ratchet teeth 34T are provided on the inner surface of the SG power transmission shaft 34 (the outer shaft).

The high-pressure clutch 35 is also the ratchet type one-way clutch. On the outer surface of the SG power transmission shaft 34 (the inner shaft), a plurality of recesses 34R are provided at equal intervals in a circumferential direction. In each of the recesses 34R, a clutch claw 34N has a shape housable therein is supported in a state of being rockable in the radial direction with a pivot shaft 34P as a center and being pressed against the radially outer side by an elastic member 34S such as a spring. Further, sawtooth-shaped ratchet teeth 36T are provided on the inner surface of the high-pressure power transmission shaft 36 (the outer shaft).

In the low-pressure clutch 33 and the high-pressure clutch 35 having such a configuration, when the inner shaft tries to rotate in the counterclockwise direction with respect to the outer shaft, the clutch claws 34N and 32N in the state of being pressed against the radially outer side come into contact with pressure receiving surfaces 36Ts and 34Ts of the corresponding ratchet teeth 36T and 34T to apply force in the circumferential direction. As a result, both shafts engage with each other and rotate at the same speed, and the power is transmitted from the inner shaft to the outer shaft.

In contrast, when the inner shaft tries to rotate in the clockwise direction with respect to the outer shaft (or the outer shaft tries to rotate in the counterclockwise direction with respect to the inner shaft), the clutch claws 34N and 32N repeat movement in which the clutch claws 34N and 32N are pressed by apexes of the corresponding ratchet teeth 36T and 34T to rock radially inward toward the recesses 34R and 32R while the outer surfaces of the clutch claws 34N and 32N are in contact with the apexes, and are pressed against the radially inner side when the apexes pass. At this time, both shafts do not engage with each other through the process (i.e., both shafts mutually race), and the power is not transmitted.

The case where the shafts configuring the power transmission device 30 rotate in the counterclockwise direction has been described above; however, the rotation direction may be the clockwise direction. Therefore, the function of the one-way clutch can be generalized and expressed as follows. When the inner shaft out of the two adjacent shafts tries to rotate in a first direction of the circumferential direction with respect to the outer shaft, the one-way clutch causes the both shafts to engage with each other and to rotate at the same speed, and transmits the power, whereas when the inner shaft tries to rotate in a second direction of the circumferential direction with respect to the outer shaft, the one-way clutch causes the both shafts to disengage from each other, and does not transmit the power.

In the power transmission device 30 according to the present disclosure, however, the three shafts rotate in the same direction. Therefore, in terms of the rotational speeds of the shafts, the function of the one-way clutch can be expressed as follows irrespective of the rotation direction as described above. When the inner shaft out of the two adjacent shafts tries to rotate at the speed higher than the speed of the outer shaft, the clutch causes the both shafts to engage with each other and to rotate at the same speed, and transmits the power, whereas when the outer shaft tries to rotate at the speed higher than the speed of the inner shaft, the clutch causes the both shafts to disengage from each other, and does not transmit the power.

Further, the example in which the low-pressure power transmission shaft 32 and the high-pressure power transmission shaft 36 are made short so as to be housed inside the bearing chamber 60C and the clutch 37 is disposed near the inner end part of the power transmission device 30 in the direction of the center axis CL has been described above. Alternatively, the above-described both shafts may be formed so as to extend long radially outward through the inside of the strut 60S as with the SG power transmission shaft 34, and the clutch 37 may be disposed near the outer end part thereof. According to such a configuration, there is an advantage that the clutch 37 as a mechanism including a movable parts can be easily accessed from outside of the engine, and maintenance and inspection of the clutch 37 can be easily performed.

The operation of the turbo fan engine that includes the power transmission device 30 having the above-described configuration is described below.

(1) At Startup (Before Rotation Assistance Ends)

In a state where the engine is stopped, namely, in a state where neither the low-pressure shaft 10 nor the high-pressure shaft 20 rotate, the power is supplied to the starter generator 50 to operate the starter generator 50 as an electric motor. Then, the SG power transmission shaft 34 that is connected in a state where power transmission with the starter generator 50 is performable starts to rotate. At this time, as described above, the high-pressure clutch 35 causes the SG power transmission shaft 34 and the high-pressure power transmission shaft 36 to engage with each other and to rotate at the same speed, and starts power transmission from the SG power transmission shaft 34 to the high-pressure power transmission shaft 36. As a result, the high-pressure shaft 20 that is connected to the high-pressure power transmission shaft 36 through the bevel gears 36V and 20V starts to rotate, and the rotational speed thereof increases with time.

At a time when the rotational speed of the high-pressure shaft 20 reaches a predetermined value, fuel injection (and operation of ignitor) inside the combustor is started. Presently, the fuel is ignited, and the power generated when generated combustion gas passes through the high-pressure turbine also starts to contribute to increase of the rotational speed of the high-pressure shaft 20. Thereafter, when the engine reaches the self-sustaining operation state, the rotation assistance ends.

(2) At Startup (after Rotation Assistance Ends) and During Normal Operation After Startup At the end of the rotation assistance, the starter generator 50 that has operated as the electric motor starts operation as a generator. This indicates that a rotation load is applied to the starter generator 50, and the rotational speed of the starter generator 50 starts to decrease. Along therewith, the rotational speed of the SG power transmission shaft 34 also starts to decrease. At this time, the rotational speed of the high-pressure power transmission shaft 36 also increases along with the increase of the rotational speed of the high-pressure shaft 20. Therefore, as described above, the high-pressure clutch 35 causes the SG power transmission shaft 34 and the high-pressure power transmission shaft 36 to disengage from each other. Accordingly, the power transmission is not performed any more between the both shafts.

On the other hand, the rotational speed of the low-pressure shaft 10 increases in parallel to increase of the rotational speed of the high-pressure shaft 20 from the time of startup of the engine. The rotational speed of the low-pressure shaft 10 exceeds the rotational speed of the SG power transmission shaft 34 that gradually decreases as described above, at any time. At this time, as described above, the low-pressure clutch 33 causes the low-pressure power transmission shaft 32 and the SG power transmission shaft 34 to engage with each other and to rotate at the same speed, and starts the power transmission from the low-pressure power transmission shaft 32 to the SG power transmission shaft 34. As a result, the power supply from the low-pressure shaft 10 that is connected to the low-pressure power transmission shaft 32 through the bevel gears 32V and 10V, to the starter generator 50 is started, and electricity is generated by the starter generator 50 that operates as the generator.

Thereafter, the rotational speed of the low-pressure shaft 10 and the rotational speed of the high-pressure shaft 20 continuously increase, and the rating of the engine eventually reaches the idle rating. Further, as described above, since the rotational speed of the high-pressure power transmission shaft 36 is higher than the rotational speed of the low-pressure power transmission shaft 32 over the whole of the flight mission, the engagement state of the low-pressure clutch 33 is constantly maintained even if the rating is varied (increases or decreases).

Note that the operation when the rating of the engine is decreased is as follows. During the operation of the turbo fan engine 1, the more or less limited generation load is constantly applied to the starter generator 50. Therefore, the rotational speed of the SG power transmission shaft 34 that supplies the power to the starter generator 50 decreases due to the generation load unless the SG power transmission shaft 34 receives power supply. Therefore, in the case where the rating of the engine is reduced and the rotational speed of the low-pressure shaft 10, accordingly, the rotational speed of the low-pressure power transmission shaft 32 decreases, the engagement state of the low-pressure clutch 33 is temporarily released, and the rotational speed of the SG power transmission shaft 34 decreases slightly behind the release of the engagement state and becomes lower than the rotational speed of the low-pressure power transmission shaft 32 that has reached a static state, in a short time.

At this point, the low-pressure clutch 33 recovers the engagement state again, and power supply from the low-pressure shaft 10 to the starter generator 50 is resumed.

As described above, the power is constantly supplied from the low-pressure shaft 10 to the starter generator 50 from the time when the rating reaches the idle rating after the startup.

(3) During Windmill

In a case where the turbo fan engine is stopped during flight due to occurrence of flame out in which combustion inside the combustor stops, emergency stop operation by a crew of the aircraft, or the like, the low-pressure shaft and the high-pressure shaft race like a windmill due to flowing-in air at ram pressure equivalent to the aircraft speed. Such an operation state is called a windmill state.

When the turbo fan engine is put into the windmill state, the rotational speed of the low-pressure shaft and the rotational speed of the high-pressure shaft gradually decrease. However, the air hardly flows into the high-pressure compressor connected to the high-pressure shaft because the fan and the low-pressure compressor connected to the low-pressure shaft are located on the front side of the high-pressure compressor. Therefore, in the common turbo fan engine, the high-pressure shaft tends to be statically settled at the rotational speed lower than the rotational speed of the low-pressure shaft. Note that, in the windmill state, since the high-pressure shaft has already rotated, restart of the stopped turbo fan engine is performed without the rotation assistance by the starter, in particular in a case where the aircraft speed is large.

In contrast, in the turbo fan engine 1 including the power transmission device 30 according to the present disclosure, since the engagement state of the low-pressure clutch 33 is maintained as described above, the low-pressure power transmission shaft 32 connected to the low-pressure shaft 10 through the bevel gear 10V continues the rotation synchronized with the SG power transmission shaft (i.e., rotation at same rotational speed). On the other hand, when the rotational speed of the high-pressure shaft 20 gradually decreases to be lower than the rotational speed of the low-pressure shaft 10, the high-pressure clutch 35 causes the SG power transmission shaft 34 and the high-pressure power transmission shaft 36 connected to the high-pressure shaft 20 through the bevel gear 20V, to engage with each other, and to rotate at the same speed. As a result, all of the three shafts (the low-pressure power transmission shaft 32, the SG power transmission shaft 34, and the high-pressure power transmission shaft 36) configuring the power transmission device 30 rotate in synchronization with one another, which causes the high-pressure shaft 20 and the low-pressure shaft 10 to rotate in synchronization with each other. The rotational speeds of the both shafts at this time are equal to the rotational speed of the low-pressure shaft of the common turbo fan engine in the windmill state. In other words, the rotational speed of the high-pressure shaft 20 at this time is higher than the rotational speed of the high-pressure shaft of the common turbo fan engine in the windmill state. This produces an effect favorable to design of the fuel pump that is one of the accessories. The effect is described in detail below.

Figure 4:
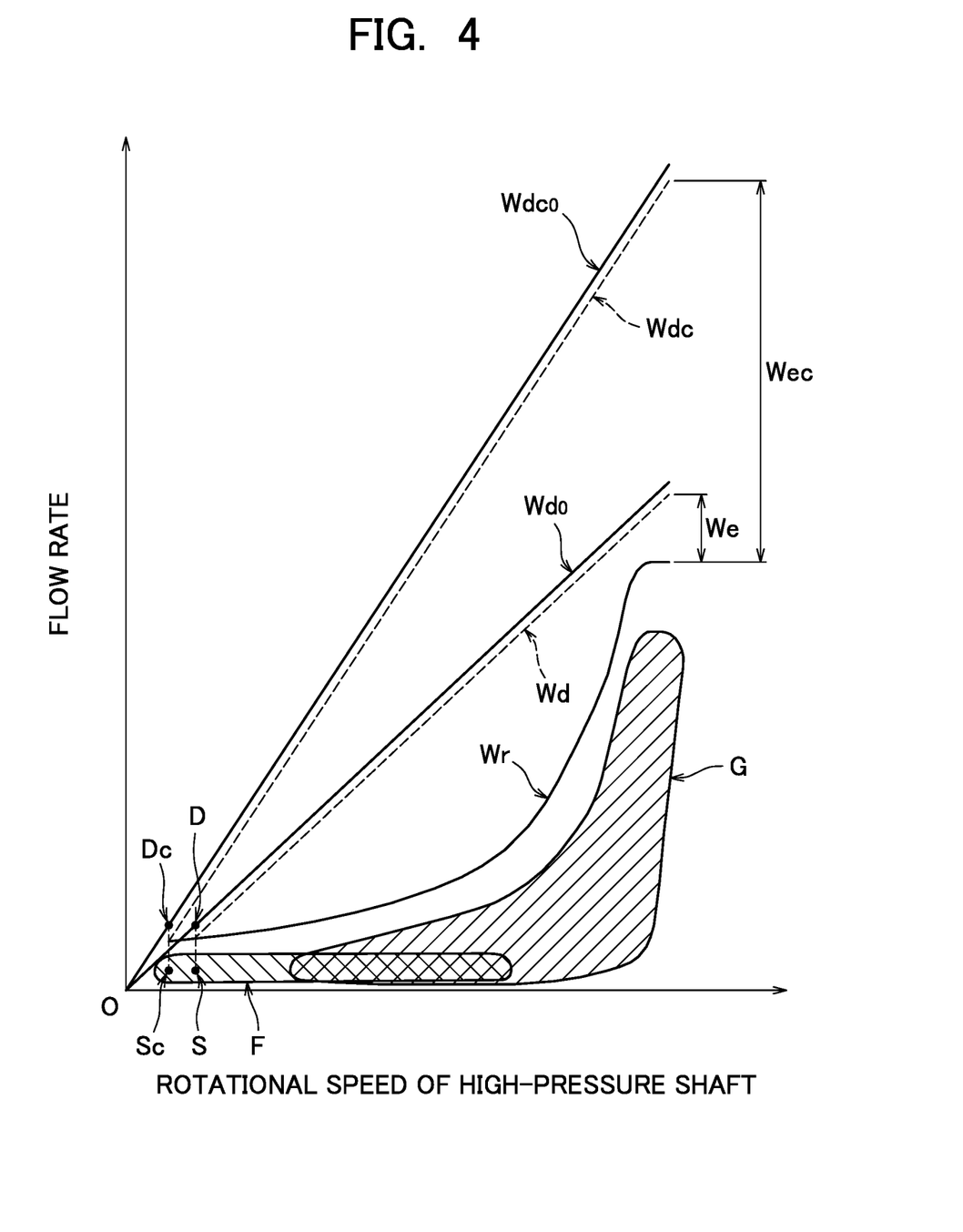
FIG. 4 is a graph illustrating relationship between both of a discharge flow rate of a fuel pump and a combustion flow rate of the turbo fan engine, and rotational speed of a high-pressure shaft.

FIG. 4 is a graph illustrating relationship between both of a discharge flow rate of the fuel pump (a flow rate of fuel discharged from the fuel pump) and a combustion flow rate (a flow rate of fuel supplied to the combustor) of the turbo fan engine, and the rotational speed of the high-pressure shaft. A vertical axis indicates the flow rate (the discharge flow rate of the fuel pump or the combustion flow rate), and a lateral axis indicates the rotational speed of the high-pressure shaft.

In the figure, a reference sign G indicates a range of the combustion flow rate requested at startup on the ground and during the self-sustaining operation in consideration of acceleration and deceleration, and a reference sign F indicates a range of the combustion flow rate requested for restart (without the rotation assistance by starter) in the air.

The fuel discharged from the fuel pump is supplied not only to the combustor but also to an actuator that drives a variable mechanism (variable stator vane of compressor, valve inside fuel metering unit, and the like). Further, the variable mechanism has internal leakage. Accordingly, the flow rate of the fuel to be discharged by the fuel pump is a flow rate obtained by adding the supply amount to the actuator and the internal leakage of the variable mechanism to the flow rate of the ranges G and F in the figure. A requested discharge flow rate of the fuel pump is indicated by a curved line Wr in the figure.

In the turbo fan engine for a commercial aircraft, a gear pump having a long lifetime is normally used as the fuel pump, and the discharge flow rate of the gear pump is substantially proportional to the rotational speed. Further, the gear pump is designed based on, as a design point, an aerial restart condition without the rotation assistance by the starter in order to enable restart of the turbo fan engine in the windmill state.

The design point of the fuel pump in the common turbo fan engine is indicated by Dc in the figure. The point Dc is a point determined by adding the internal leakage of the fuel pump itself to the requested discharge flow rate of the fuel pump corresponding to the rotational speed of the high-pressure shaft under the aerial restart condition indicated by Sc in the figure. A straight line Wdc0 connecting the point Dc and an origin O of the graph indicates an ideal discharge flow rate (i.e., without internal leakage) of the fuel pump. Note that a straight line Wdc in the figure indicates the discharge flow rate of the fuel pump considering the internal leakage.

The fuel pump designed in the above-described manner discharges the fuel at the just enough flow rate under the aerial restart condition, whereas the fuel pump discharged the fuel at the flow rate largely exceeding the requested discharge flow rate of the fuel pump indicated by the curved line Wr in a state where the turbo fan engine operates at the high rating (i.e., state where rotational speed of high-pressure shaft is high), as indicated by an arrow Wec in the figure. The excess fuel is returned to an inlet side of the fuel pump; however, pressure energy is converted into heat energy by a decompression valve through which the excess fuel passes at this time, and the heat energy is dissipated, which raises the temperature of the fuel. Thus, a fuel cooler incorporated in the fuel system in order to compensate the temperature rise is requested to have large cooling capacity, and is accordingly increased in size and weight. In addition, a large amount of air at a fan outlet is requested to be extracted as a cooling medium from the bypass flow path, which deteriorates fuel efficiency of the turbo fan engine. As described above, there are issues that the fuel pump designed by the above-described method has the excessively large size and weight, and requests the fuel cooler having a large size and a large weight as well, which further deteriorates the fuel efficiency of the turbo fan engine.

In contrast, in the turbo fan engine 1 including the power transmission device 30 according to the present disclosure, the rotational speed of the high-pressure shaft 20 in the windmill state is higher than the rotational speed of the high-pressure shaft in the common turbo fan engine as described above. As a result, the aerial restart condition of the turbo fan engine 1 corresponds to a point S shifted on a right side in the figure from the aerial restart condition Sc of the common turbo fan engine, and the design point of the fuel pump becomes a point D shifted on the right side in the figure from the design point Dc of the common turbo fan engine. Accordingly, an inclination of a straight line Wd0 (a straight line indicating ideal discharge flow rate of the fuel pump) connecting the point D and the origin O of the graph is smaller than an inclination of the straight line Wdc0 in the case of the common turbo fan engine. Note that a straight line Wd in the figure indicates the discharge flow rate of the fuel pump considering the internal leakage.

As a result, in the state where the turbo fan engine operates at the high rating, the flow rate of the excess fuel discharged exceeding the requested discharge flow rate of the fuel pump indicated by the curved line Wr is significantly reduced as compared with the case (Wec) of the common turbo fan engine, as indicated by an arrow We in the figure. This makes it possible to achieve excellent effects that the size and the weight of each of the fuel pump and the fuel cooler are reduced and the flow rate of the air at the fan outlet extracted as the cooling medium and the power extracted from the main shaft (the low-pressure shaft 10) in order to drive the fuel pump are also reduced, in contrary to the case of the common turbo fan engine.

Note that, as each of the low-pressure clutch and the high-pressure clutch, a roller type clutch may be used in place of the ratchet type clutch illustrated in FIG. 2.

Figure 3:
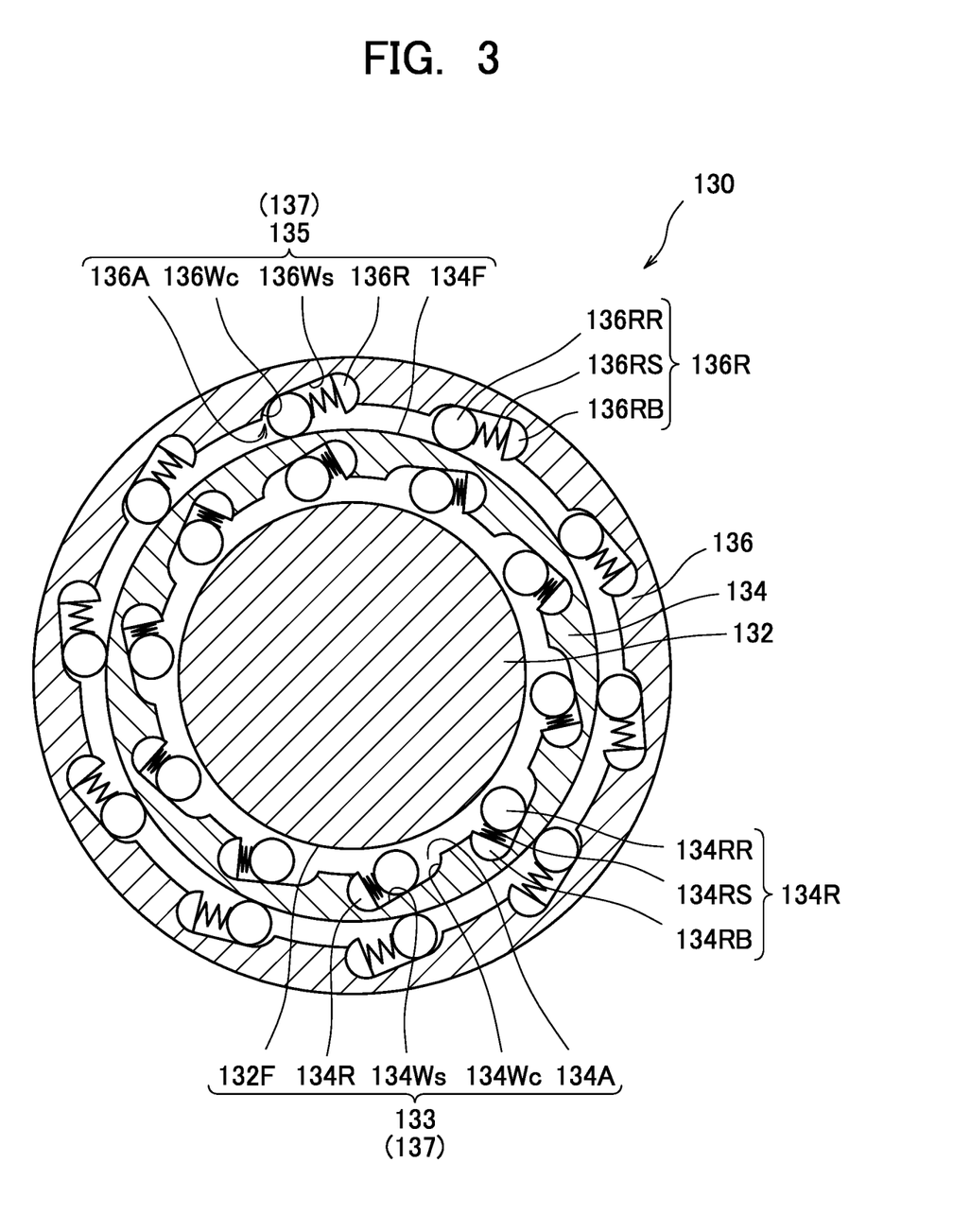
FIG. 3 is a diagram viewed from the direction of the arrow A in FIG. 1 and illustrates a cross-section perpendicular to the axial direction, of the power transmission device according to another embodiment.

FIG. 3 is a diagram illustrating a cross-section perpendicular to the axial direction, of a power transmission device 130 provided with a clutch 137 that includes a low-pressure clutch 133 and a high-pressure clutch 135 each formed as a roller type one-way clutch.

An outer surface 132F of a low-pressure power transmission shaft 132 configuring the inner part of the low-pressure clutch 133 is formed as a cylindrical surface, whereas an inner surface of an SG power transmission shaft 134 configuring the outer part of the low-pressure clutch 133 includes a plurality of housing spaces 134A that are disposed at equal intervals in the circumferential direction. Further, roller assemblies 134R are housed in the respective housing spaces 134A.

A radially outer wall of each of the housing spaces 134A includes a plane wall part 134Ws that is inclined radially inward toward the rotation direction of the SG power transmission shaft 134, and a recessed wall part 134Wc that is located on the front side of the plane wall part 134Ws in the rotation direction. Therefore, a distance in the radial direction from the outer surface 132F of the low-pressure power transmission shaft 132 is linearly reduced with respect to the plane wall part 134Ws and is reduced in a manner that a change rate is gradually increased with respect to the recessed wall part 134Wc, in the above-described rotation direction.

Each of the roller assemblies 134R includes a spring pedestal 134RB, a spring 134RS attached to the spring pedestal 134RB, and a roller 134RR that is supported at a front end of the spring 134RS so as to be rotatable around an axis (not illustrated) extending in a direction of a center axis of the SG power transmission shaft 134. The spring pedestal 134RB is fixed to a rear end part of the corresponding housing space 134A in the above-described rotation direction, and the spring 134RS and the roller 134RR extend from the spring pedestal 134RB forward in the above-described rotation direction. The spring 134RS is formed to apply forward elastic force in the above-described rotation direction, to the roller 134RR. Further, the distance in the radial direction from the outer surface 132F of the low-pressure power transmission shaft 132 is set to be larger than an outer diameter of the roller 134RR with respect to the plane wall part 134Ws of each of the housing spaces 134A, is set to be smaller than the outer diameter of the roller 134RR with respect to the recessed wall part 134Wc of each of the housing spaces 134A, and is set to be equal to the outer diameter of the roller 134RR with respect to a boundary between the both wall parts.

An outer surface 134F of the SG power transmission shaft 134 configuring the inner part of the high-pressure clutch 135 is formed as a cylindrical surface, whereas an inner surface of a high-pressure power transmission shaft 136 configuring the outer part of the high-pressure clutch 135 includes a plurality of housing spaces 136A that are disposed at equal intervals in the circumferential direction. Further, roller assemblies 136R are housed in the respective housing spaces 136A.

A radially outer wall of each of the housing spaces 136A includes a plane wall part 136Ws that is inclined radially inward toward the rotation direction of the high-pressure power transmission shaft 136, and a recessed wall part 136Wc that is located on the front side of the plane wall part 136Ws in the rotation direction. Therefore, a distance in the radial direction from the outer surface 134F of the SG power transmission shaft 134 is linearly reduced with respect to the plane wall part 136Ws and is reduced in a manner that a change rate is gradually increased with respect to the recessed wall part 136Wc, in the above-described rotation direction.

Each of the roller assemblies 136R includes a spring pedestal 136RB, a spring 136RS attached to the spring pedestal 136RB, and a roller 136RR that is supported at a front end of the spring 136RS so as to be rotatable around an axis (not illustrated) extending in a direction of a center axis of the high-pressure power transmission shaft 136. The spring pedestal 136RB is fixed to a rear end part of the corresponding housing space 136A in the above-described rotation direction, and the spring 136RS and the roller 136RR extend from the spring pedestal 136RB forward in the above-described rotation direction. The spring 136RS is formed to apply forward elastic force in the above-described rotation direction, to the roller 136RR. Further, the distance in the radial direction from the outer surface 134F of the SG power transmission shaft 134 is set to be larger than an outer diameter of the roller 136RR with respect to the plane wall part 136Ws of each of the housing spaces 136A, is set to be smaller than the outer diameter of the roller 136RR with respect to the recessed wall part 136Wc of each of the housing spaces 136A, and is set to be equal to the outer diameter of the roller 136RR with respect to a boundary between the both wall parts.

In the low-pressure clutch 133 and the high-pressure clutch 135 having such a configuration, when the inner shaft tries to rotate in the counterclockwise direction with respect to the outer shaft, the rollers 134RR and 136RR rotate following the inner shafts and move forward inside the respective housing spaces 134A and 136A, and radially outer surfaces of the rollers 134RR and 136RR respectively come into contact with the recessed wall parts 134Wc and 136Wc. As described above, the distances in the radial direction from the outer surfaces 132F and 134F of the inner shafts to the recessed wall parts 134Wc and 136Wc are set smaller than the outer diameters of the rollers 134RR and 136RR, respectively. Therefore, in this state, the rollers 134RR and 136RR are respectively sandwiched and fixed between the outer surface 132F of the inner shaft and the recessed wall parts 134Wc and between the outer surface 134F of the inner shaft and the recessed wall parts 136Wc. As a result, the outer shafts engage with the respective inner shafts by friction force with the rollers 134RR and 136RR, the both shafts rotate at the same speed, and the power is transmitted from the inner shafts to the respective outer shafts.

In contrast, when the inner shaft tries to rotate in the clockwise direction with respect to the outer shaft (or the outer shaft tries to rotate in the counterclockwise direction with respect to the inner shaft), the rollers 134RR and 136RR move rearward inside the housing spaces 134A and 136A against the elastic force of the springs 134RS and 136RS caused by the rotation motion of the outer shafts, respectively, and the radially outer surfaces of the rollers 134RR and 136RR respectively come into contact with the plane wall parts 134Ws and 136Ws. As described above, the distances in the radial direction from the outer surfaces 132F and 134F of the inner shafts to the plane wall parts 134Ws and 136Ws are set larger than the outer diameters of the rollers 134RR and 136RR, respectively. Therefore, in this state, the rollers 134RR and 136RR can freely rotate without being restricted by any of the outer surfaces 132F and 134F of the inner shafts and the plane wall parts 134Ws and 136Ws, respectively. Accordingly, the outer shafts do not engage with the respective inner shafts (i.e., both shafts mutually race), and the power is not transmitted.

In the above description, each of the clutches 37 and 137 has been described as a clutch including the two clutches having the same structure (the low-pressure clutch 33 or 133 and the high-pressure clutch 35 or 135); however, the other configuration is adoptable. In the following, a clutch 270 using centrifugal force is described.

Figure 5:
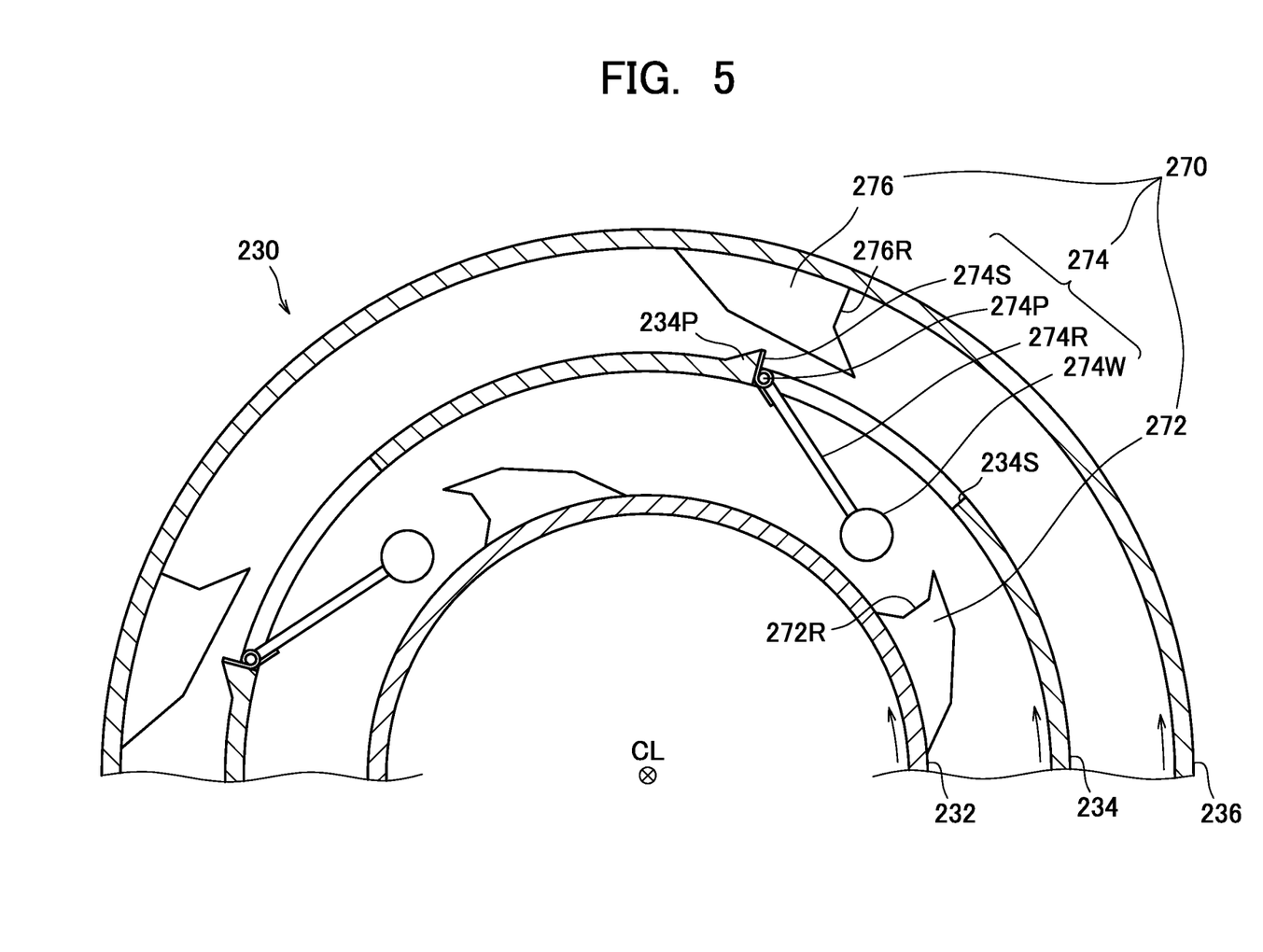
FIG. 5 is a diagram illustrating a cross-section perpendicular to the axial direction, of a power transmission device that adopts a clutch using centrifugal force.

FIG. 5 is a diagram illustrating a cross-section perpendicular to the center axis CL, of a power transmission device 230 that adopts the clutch 270 using centrifugal force.

The clutch 270 includes a plurality of hooks 272 (first hooks) that are disposed on an outer surface of a low-pressure power transmission shaft 232 at equal intervals in a circumferential direction, a plurality of hooks 276 (second hooks) that are disposed on an inner surface of a high-pressure power transmission shaft 236 at equal intervals in the circumferential direction, and a plurality of rocking members 274 that are disposed on an SG power transmission shaft 234 at equal intervals in the circumferential direction. The number of provided hooks 272, the number of provided hooks 276, and the number of provided rocking members 274 are equal to one another.

The hooks 272 are provided so as to protrude radially outward from the outer surface of the low-pressure power transmission shaft 232. In the rotation direction (see an arrow in the figure) of the low-pressure power transmission shaft 232, rear surfaces of the respective hooks 272 are each formed in a convex surface shape, whereas front surfaces are each provided with a recessed part 272R. The recessed parts 272R have shapes to which rollers 274W of the respective rocking members 274 described below are fitted from a front side.

On the other hand, the hooks 276 are provided so as to protrude radially inward from the inner surface of the high-pressure power transmission shaft 236. In the rotation direction (see an arrow in the figure) of the high-pressure power transmission shaft 236, front surfaces of the respective hooks 276 are each formed in a convex surface shape, whereas rear surfaces are each provided with a recessed part 276R. The recessed parts 276R have shapes to which the rollers 274W of the respective rocking members 274 described below are fitted from a rear side.

Each of the rocking members 274 includes, as main components, a rod 274R and the roller 274W supported at a front end of the rod 274R.

Each of the rollers 274W is formed as a sphere or a cylinder, and is supported at the front end of the corresponding rod 274R so as to be rotatable around an axis (not illustrated) extending in the direction of the center axis CL of the power transmission device 230.

The SG power transmission shaft 234 includes slits 234S each extending in the circumferential direction. A pivot shaft 274P that extends in the direction of the center axis CL of the power transmission device 230 is supported at a front end part of each of the slits 234S in the rotation direction (see an arrow in the figure) of the SG power transmission shaft 234. In contrast, a protrusion 234P that includes a flat surface extending in the radial direction is provided on the front side of each of the slits 234S in the rotation direction of the SG power transmission shaft 234, on an outer surface of the SG power transmission shaft 234. Note that a height (protruding amount in the radial direction from the outer surface of the SG power transmission shaft 234) of each of the protrusions 234P is set so as not to interfere with the hooks 276 when the SG power transmission shaft 234 and the high-pressure power transmission shaft 236 relatively rotate.

The rods 274R are supported so as to be rockable in the radial direction around the above-described respective pivot shafts 274P. Note that the above-described slits 234S are each formed to have a dimension (length in a circumferential direction and length in an axis direction) that enables the rods 274R and the rollers 274W supported at the front ends of the respective rods 274R as a whole to pass through the slits 234S in the radial direction when the rods 274R rock around the respective pivot shafts 274P.

Torsion coil springs 274S are attached to the respective pivot shafts 274P. More specifically, each of the pivot shafts 274P extends through the inside of a coil part of the corresponding torsion coil spring 274S. Further, a first end part of each of the torsion coil springs 274S is fixed to the flat surface of the corresponding protrusion 234P extending in the radial direction, and a second end part is fixed to a base end part of the corresponding rod 274R. As a result, when the rods 274R rock radially outward, the coils of the respective torsion coil springs 274S are wound to generate repulsive force in a direction opposite to that direction, and the rods 274R receive force directed radially inward.

The clutch 270 is formed so as to balance the force directed radially inward by the torsion coil springs 274S and the centrifugal force acting on the rocking members 274 (the rods 274R and the rollers 274W) to change radial positions of the respective rollers 274W depending on the rotation state of the shafts, and to accordingly switch a state where the rollers 274W and the respective hooks 272 engage with each other and a state where the rollers 274W and the respective hooks 276 engage with each other. The configuration is described in detail below.

When the SG power transmission shaft 234 rotates, the rocking members 274 rock radially outward by action of the centrifugal force generated depending on the rotational speed, and are each put into a balanced state at a position where the repulsive force directed radially inward by the coil springs 274S and the centrifugal force are equal to each other. Accordingly, the rotational speed of the SG power transmission shaft 234 and the radial positions of the rollers 274W of the rocking members 274 have one-to-one correspondence relationship.

Therefore, the mass of each of the rocking members 274 and a spring constant of each of the torsion coil springs 274S are set such that the rollers 274W of the rocking members 274 rock radially inward up to positions where the rollers 274W can fit into the respective recessed parts 272R of the hooks 272 when the rotational speed of the SG power transmission shaft 234 is lower than or equal to low-speed side changeover rotational speed, and the rollers 274W of the rocking members 274 rock radially outward up to positions where the rollers 274W can fit into the respective recessed parts 276R of the hooks 276 when the rotational speed of the SG power transmission shaft 234 is higher than or equal to high-speed side changeover rotational speed.

Operation of the clutch 270 having the above-described configuration is described below with reference to FIGS. 6A to 6D.

Figure 6A:
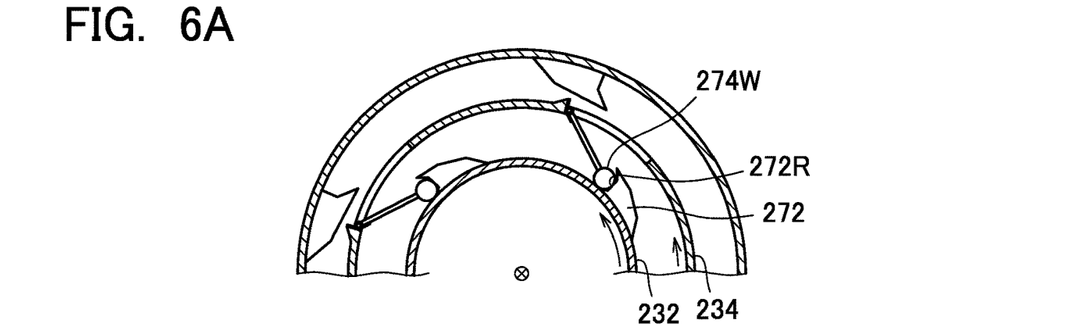
FIG. 6A is a diagram illustrating an operation mode of the clutch using centrifugal force, and illustrates a state where an SG power transmission shaft rotates at low speed lower than or equal to low-speed side changeover rotational speed or is stopped, and rotational speed of the SG power transmission shaft is lower than rotational speed of a low-pressure power transmission shaft.

(1) When the SG Power Transmission Shaft 234 Rotates at Low Speed Lower than or Equal to the Low-Speed Side Changeover Rotational Speed or is Stopped (1-1) When Rotational Speed of the SG Power Transmission Shaft 234 is Lower than Rotational Speed of the Low-Pressure Power Transmission Shaft 232

The rollers 274W of the rocking members 274 are caught up by the respective hooks 272 approaching from the rear side, and are fitted into the respective recessed parts 272R (see FIG. 6A). As a result, the SG power transmission shaft 234 and the low-pressure power transmission shaft 232 engage with each other and rotate at the same speed, and the power is transmitted from the low-pressure power transmission shaft 232 to the SG power transmission shaft 234.

Figure 6B:
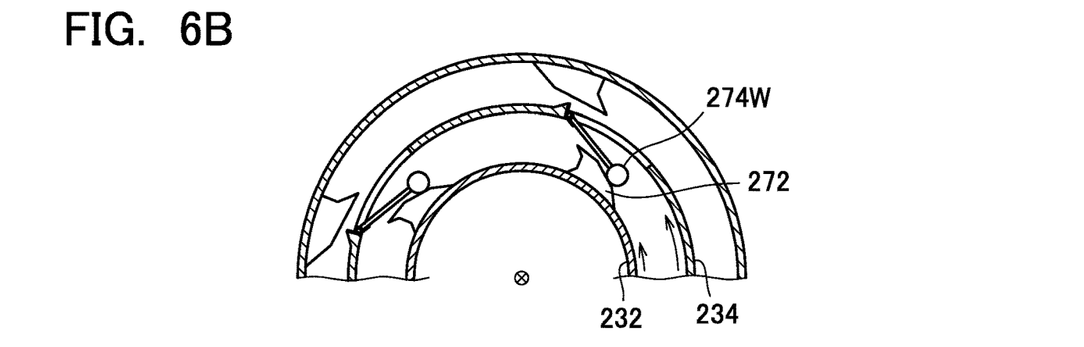
FIG. 6B is a diagram illustrating an operation mode of the clutch using centrifugal force, and illustrates a state where the SG power transmission shaft rotates at low speed lower than or equal to the low-speed side changeover rotational speed or is stopped, and the rotational speed of the SG power transmission shaft is higher than the rotational speed of the low-pressure power transmission shaft.

(1-2) When the Rotational Speed of the SG Power Transmission Shaft 234 is Higher than the Rotational Speed of the Low-Pressure Power Transmission Shaft 232

The rollers 274W of the rocking members 274 repeatedly ride on the rear surfaces of the respective hooks 272 formed in convex surface shapes while rotating every time the rollers 274W catch up with the respective hooks 272 from the rear side (see FIG. 6B), and eventually overtake the respective hooks 272. In other words, the SG power transmission shaft 234 and the low-pressure power transmission shaft 232 do not engage with each other, and the power is not transmitted between the both shafts.

Figure 6C:
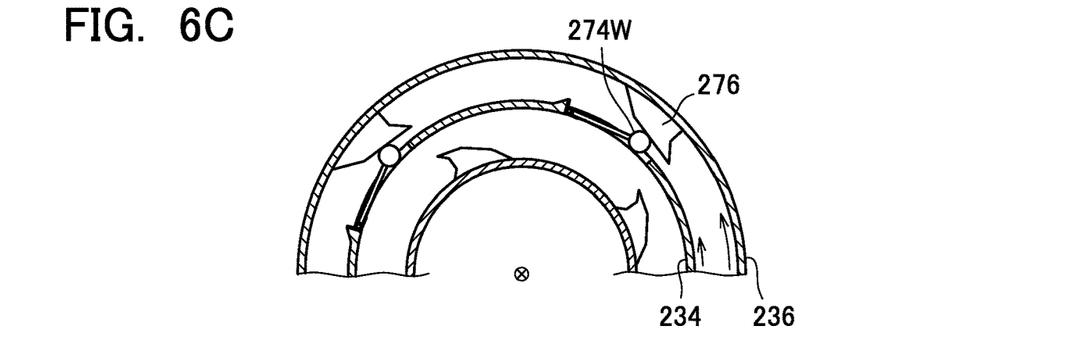
FIG. 6C is a diagram illustrating an operation mode of the clutch using centrifugal force, and illustrates a state where the SG power transmission shaft rotates at high speed lower than or equal to high-speed side changeover rotational speed, and the rotational speed of the SG power transmission shaft is lower than rotational speed of a high-pressure power transmission shaft.

(2) When the SG Power Transmission Shaft 234 Rotates at High Speed Lower than or Equal to the High-Speed Side Changeover Rotational Speed (2-1) When Rotational Speed of the SG Power Transmission Shaft 234 is Lower than Rotational Speed of the High-Pressure Power Transmission Shaft 236

The rollers 274W of the rocking members 274 repeatedly ride on the rear surfaces of the respective hooks 276 formed in convex surface shapes while rotating every time the rollers 274W are caught up by the respective hooks 276 approaching from the rear side (see FIG. 6C), and are eventually overtaken by the hooks 276. In other words, the SG power transmission shaft 234 and the high-pressure power transmission shaft 236 do not engage with each other, and the power is not transmitted between the both shafts.

Figure 6D:
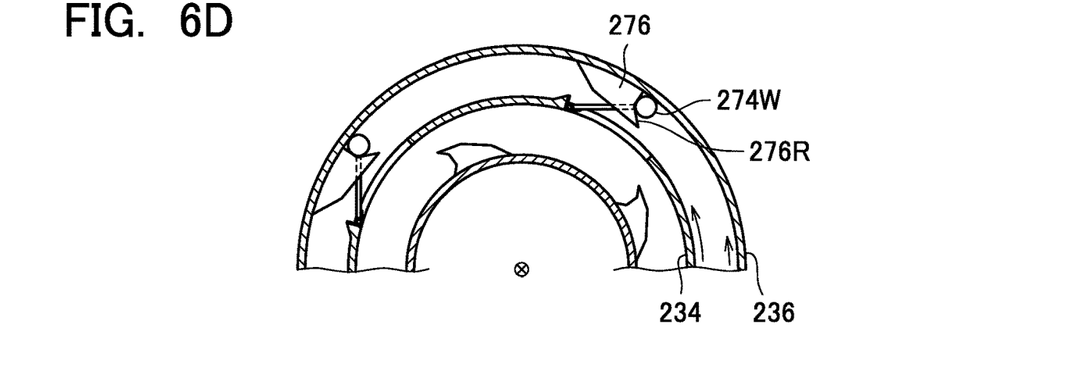
FIG. 6D is a diagram illustrating an operation mode of the clutch using centrifugal force, and illustrates a state where the SG power transmission shaft rotates at high speed lower than or equal to the high-speed side changeover rotational speed, and the rotational speed of the SG power transmission shaft is higher than the rotational speed of the high-pressure power transmission shaft.

(2-2) When the Rotational Speed of the SG Power Transmission Shaft 234 is Higher than the Rotational Speed of the High-Pressure Power Transmission Shaft 236

The rollers 274W of the rocking members 274 catch up with the respective hooks 276 from the rear side, and are fitted into the respective recessed parts 276R of the hooks 276 (see FIG. 6D). As a result, the SG power transmission shaft 234 and the high-pressure power transmission shaft 236 engage with each other and rotate at the same speed, and the power is transmitted from the SG power transmission shaft 234 to the high-pressure power transmission shaft 236.

Accordingly, at the startup of the turbo fan engine including the power transmission device 230 (before the rotation assistance ends), the clutch 270 is put into the above-described operation state (2-2), the power is supplied from the starter generator 50 to the high-pressure shaft 20 through the SG power transmission shaft 234 and the high-pressure power transmission shaft 236, and the rotation assistance is performed.

Further, the clutch 270 that is put into the above-described operation state (2-1) once at the startup (after the rotation assistance ends) is shifted to the above-described operation state (1-1) when the rotational speed of the SG power transmission shaft 234 decreases due to application of the rotation load to the starter generator 50 and the rotational speed of the low-pressure shaft 10 increases as the rating of the engine approaches the idle rating. As a result, the power is supplied from the low-pressure shaft 10 through the low-pressure power transmission shaft 232 and the SG power transmission shaft 234, and electricity is generated by the starter generator 50 that operates as the generator.

Note that the example in which the engagement of the two adjacent shafts is realized through engagement of the rollers 274W of the rocking members 274 and the hooks 272 or 276 of the shaft has been described above; however, the configuration of the clutch 270 is not limited thereto. For example, friction shoes may be adopted in place of the rollers of the rocking members and the hooks of the shaft may be removed, and engagement of the two adjacent shafts may be realized through engagement by friction between the friction shoes and the surface of the shaft. In this case, the friction shoes are supported such that each of the friction shoes and the surface of the shaft come into contact with each other while forming an appropriate angle. This realizes a state where the friction shoes and the surface of the shaft come into contact with each other to effectively exert friction, thereby establishing engagement and a state where the friction shoes and the surface of the shaft are in contact with each other but the friction does not effectively act and engagement is not established, depending on magnitude of the rotational speed of each of the two adjacent shafts. This makes it possible to realize operation similar to the above-described operation.

Figure 7:
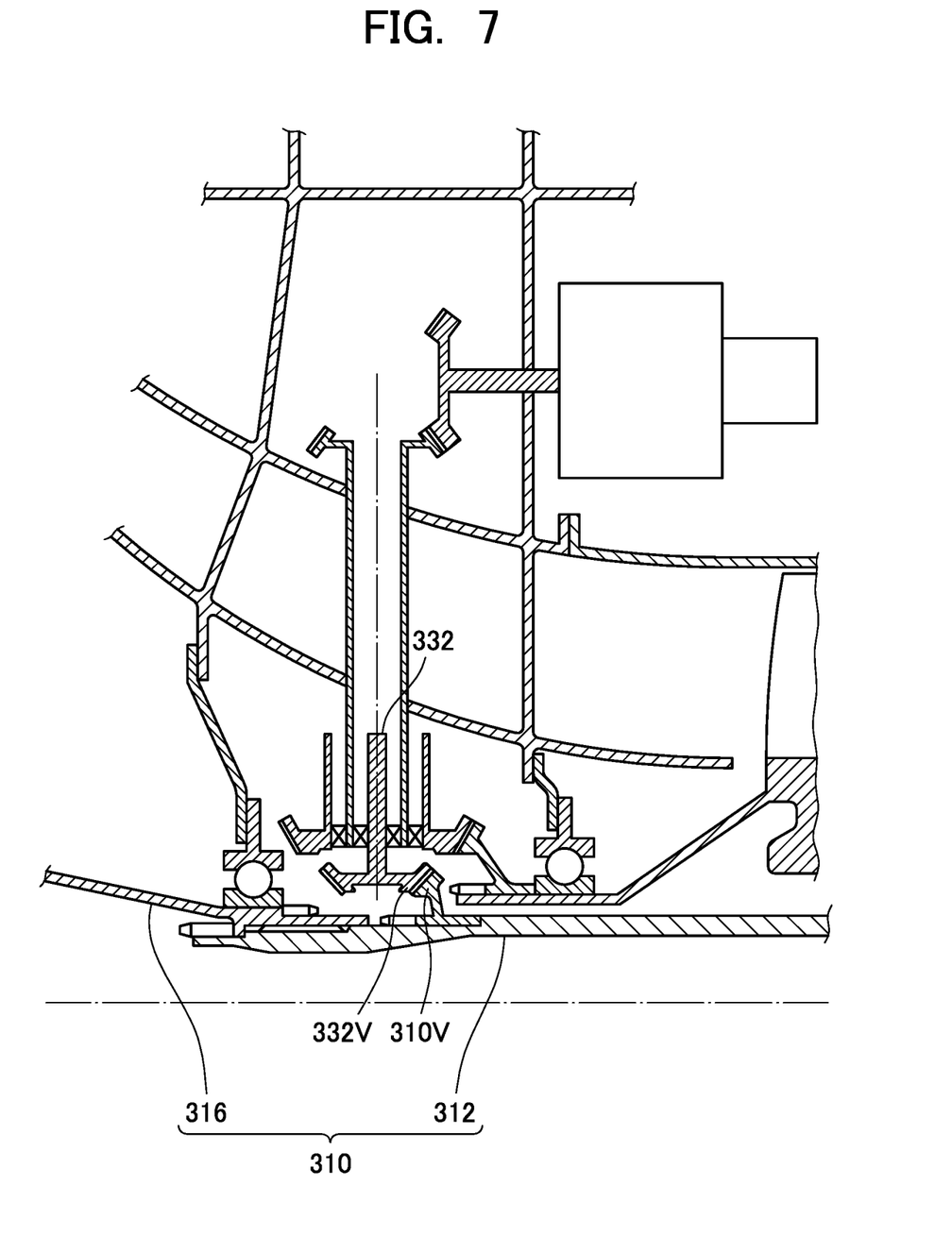
FIG. 7 is an enlarged cross-sectional view illustrating a main part of a turbo fan engine that is provided with a power transmission device according to an embodiment of the present disclosure and includes two main shafts rotating in the same direction.

The case where the turbo fan engine according to the present disclosure is formed such that the two main shafts, namely, the low-pressure shaft and the high-pressure shaft rotate in the directions opposite to each other has been described above; however, the turbo fan engine according to the present disclosure may be formed such that the two main shafts rotate in the same direction. In this case, as illustrated in FIG. 7, a bevel gear 310V on a low-pressure shaft 310 is attached not to a fan shaft 316 but to a fan drive shaft 312 so as to be located on the rear side of a bevel gear 332V of a low-pressure power transmission shaft 332.

The example in which the turbo fan engine according to the present disclosure is the two-spool turbo fan engine, and supplies the power to the high-pressure shaft through the power transmission shaft on the outermost side of the power transmission device at startup and extracts power from the low-pressure shaft through the power transmission shaft on the innermost side of the power transmission device after the startup has been described above; however, the turbo fan engine according to the present disclosure may be a turbo fan engine including three or more spools. For example, in a case of a three-spool turbo fan engine, the power is supplied to the high-pressure shaft (or a intermediate-pressure shaft) through the power transmission shaft on the outermost side of the power transmission device at startup, and the power is extracted from the intermediate-pressure shaft (or the low-pressure shaft) through the power transmission shaft on the innermost side of the power transmission device after the startup.

Aspects of Present Disclosure

A turbo fan engine according to a first aspect of the present disclosure includes a first main shaft, a second main shaft, a power transmission device, and a starter generator. The power transmission device includes a first shaft, an intermediate shaft, and a second shaft that are coaxially disposed, and a clutch. The first shaft is connected to the first main shaft through a pair of bevel gears. The intermediate shaft is disposed outside of the first shaft and is connected to the starter generator through a pair of bevel gears. The second shaft is disposed outside of the intermediate shaft and is connected to the second main shaft through a pair of bevel gears. When, out of any two adjacent shafts of the first shaft, the intermediate shaft, and the second shaft, an inner shaft tries to rotate at a speed higher than a speed of an outer shaft, the clutch causes the two shafts to engage with each other and to rotate at the same speed, and transmits power, whereas when the outer shaft tries to rotate at a speed higher than a speed of the inner shaft, the clutch causes the two shafts to disengage from each other, and does not transmit power.

In a turbo fan engine according to a second aspect of the present disclosure, the clutch includes a first clutch that is disposed between the first shaft and the intermediate shaft, and a second clutch that is disposed between the intermediate shaft and the second shaft.

In a turbo fan engine according to a third aspect of the present disclosure, the clutch includes a rocking member that is supported by the intermediate shaft while receiving elastic force directed radially inward and is rockable in a radial direction depending on magnitude of centrifugal force, a first hook that is disposed on an outer surface of the first shaft and is engageable with the rocking member rocking radially inward, and a second hook that is disposed on an inner surface of the second shaft and is engageable with the rocking member rocking radially outward.

A turbo fan engine according to a fourth aspect of the present disclosure includes a high-pressure shaft and a low-pressure shaft, the first main shaft is the low-pressure shaft, and the second main shaft is the high-pressure shaft.

A turbo fan engine according to a fifth aspect of the present disclosure includes a high-pressure shaft, an intermediate-pressure shaft, and a low-pressure shaft, the first main shaft is the intermediate-pressure shaft, and the second main shaft is the high-pressure shaft.

A turbo fan engine according to a sixth aspect of the present disclosure includes a high-pressure shaft, a intermediate-pressure shaft, and a low-pressure shaft, the first main shaft is the low-pressure shaft, and the second main shaft is the intermediate-pressure shaft.

EXPLANATION OF REFERENCE SIGNS

1 Turbo fan engine
10 Low-pressure shaft (first main shaft)
20 High-pressure shaft (second main shaft)
30, 130 Power transmission device
32, 132 Low-pressure power transmission shaft (first shaft)
33, 133 Low-pressure clutch (first clutch)
34, 134 SG power transmission shaft (intermediate shaft)
35, 135 High-pressure clutch (second clutch)
36, 136 High-pressure power transmission shaft (second shaft)
37, 137 Clutch
50 Starter generator
10V, 32V Bevel gear (pair of bevel gears)
34V, 42V Bevel gear (pair of bevel gears)
20V, 36V Bevel gear (pair of bevel gears)
272 Hook (first hook)
274 Rocking member
276 Hook (second hook)

The invention claimed is:

1. A turbo fan engine, comprising:
a first main shaft;
a second main shaft;
a power transmission device; and
a starter generator, wherein
the power transmission device includes a first shaft, an intermediate shaft, and a second shaft that are coaxially disposed, and a clutch,
the first shaft is connected to the first main shaft through a pair of bevel gears,
the intermediate shaft is disposed outside of the first shaft and is connected to the starter generator through a pair of bevel gears,
the second shaft is disposed outside of the intermediate shaft and is connected to the second main shaft through a pair of bevel gears, and
when, out of any two adjacent shafts of the first shaft, the intermediate shaft, and the second shaft, an inner shaft tries to rotate at a speed higher than a speed of an outer shaft, the clutch causes the two shafts to engage with each other and to rotate at the same speed, and transmits power, whereas when the outer shaft tries to rotate at a speed higher than a speed of the inner shaft, the clutch causes the two shafts to disengage from each other, and does not transmit power.

2. The turbo fan engine according to claim 1, wherein the clutch includes a first clutch that is disposed between the first shaft and the intermediate shaft, and a second clutch that is disposed between the intermediate shaft and the second shaft.

3. The turbo fan engine according to claim 1, wherein the clutch includes a rocking member that is supported by the intermediate shaft while receiving elastic force directed radially inward and is rockable in the radial direction depending on magnitude of centrifugal force, a first hook that is disposed on an outer surface of the first shaft and is engageable with the rocking member rocking radially inward, and a second hook that is disposed on an inner surface of the second shaft and is engageable with the rocking member rocking radially outward.

4. The turbo fan engine according to claim 1, wherein
the turbo fan engine includes a high-pressure shaft and a low-pressure shaft,
the first main shaft is the low-pressure shaft, and
the second main shaft is the high-pressure shaft.

5. The turbo fan engine according to claim 2, wherein
the turbo fan engine includes a high-pressure shaft and a low-pressure shaft,
the first main shaft is the low-pressure shaft, and
the second main shaft is the high-pressure shaft.

6. The turbo fan engine according to claim 3, wherein
the turbo fan engine includes a high-pressure shaft and a low-pressure shaft,
the first main shaft is the low-pressure shaft, and
the second main shaft is the high-pressure shaft.

7. The turbo fan engine according to claim 1, wherein
the turbo fan engine includes a high-pressure shaft, an intermediate-pressure shaft, and a low-pressure shaft,
the first main shaft is the intermediate-pressure shaft, and
the second main shaft is the high-pressure shaft.

8. The turbo fan engine according to claim 2, wherein
the turbo fan engine includes a high-pressure shaft, an intermediate-pressure shaft, and a low-pressure shaft,
the first main shaft is the intermediate-pressure shaft, and
the second main shaft is the high-pressure shaft.

9. The turbo fan engine according to claim 3, wherein
the turbo fan engine includes a high-pressure shaft, an intermediate-pressure shaft, and a low-pressure shaft,
the first main shaft is the intermediate-pressure shaft, and
the second main shaft is the high-pressure shaft.

10. The turbo fan engine according to claim 1, wherein
the turbo fan engine includes a high-pressure shaft, an intermediate-pressure shaft, and a low-pressure shaft,
the first main shaft is the low-pressure shaft, and
the second main shaft is the intermediate-pressure shaft.

11. The turbo fan engine according to claim 2, wherein
the turbo fan engine includes a high-pressure shaft, an intermediate-pressure shaft, and a low-pressure shaft,
the first main shaft is the low-pressure shaft, and
the second main shaft is the intermediate-pressure shaft.

12. The turbo fan engine according to claim 3, wherein
the turbo fan engine includes a high-pressure shaft, an intermediate-pressure shaft, and a low-pressure shaft,
the first main shaft is the low-pressure shaft, and
the second main shaft is the intermediate-pressure shaft.

* * * * *